United States Patent [19]

Houx, Jr. et al.

[11] 4,076,771
[45] Feb. 28, 1978

[54] BOTTOM VENTED WET-DRY WATER COOLING TOWER

[75] Inventors: James R. Houx, Jr.; Richard D. Landon, both of Shawnee Mission; Paul A. Lindahl, Jr., Overland Park, all of Kans.

[73] Assignee: The Marley Cooling Tower Company, Mission, Kans.

[21] Appl. No.: 743,359

[22] Filed: Nov. 19, 1976

[51] Int. Cl.$^2$ .............................................. B01F 3/04
[52] U.S. Cl. ............................ 261/159; 165/DIG. 1; 261/DIG. 11; 261/DIG. 77
[58] Field of Search ............... 261/24, 79 A, 109, 111, 261/112, 127, 150, 151, 158–161, DIG. 11, DIG. 77; 165/122, 111, DIG. 1; 62/305

[56] References Cited

U.S. PATENT DOCUMENTS

| 3,305,006 | 2/1967 | Daltry ........................... 261/DIG. 11 |
| 3,635,042 | 1/1972 | Spangemacher ................. 261/150 X |
| 3,743,257 | 7/1973 | Fordyce .......................... 261/112 |
| 3,846,519 | 11/1974 | Spangemacher ............. 261/DIG. 11 |
| 3,865,911 | 2/1975 | Lefevre .......................... 261/DIG. 77 |
| 3,923,935 | 12/1975 | Cates ........................... 261/DIG. 11 |
| 3,925,523 | 12/1975 | Cates ........................... 261/DIG. 11 |
| 3,929,435 | 12/1975 | Engalitcheff, Jr. ........... 261/DIG. 11 |
| 3,944,636 | 3/1976 | Schuldenberg et al. ..... 261/DIG. 77 |
| 3,994,999 | 11/1976 | Phelps ........................... 261/DIG. 77 |
| 4,003,970 | 1/1977 | Vodicka ....................... 261/DIG. 77 |

FOREIGN PATENT DOCUMENTS 1,268,169   3/1972   United Kingdom ........ 261/DIG. 77

OTHER PUBLICATIONS

Power, Cooling Towers, Mar. 1973, pp. S-1, S-7, S-9, S-24.

*Primary Examiner*—Tim R. Miles
*Assistant Examiner*—Richard L. Chiesa
*Attorney, Agent, or Firm*—Schmidt, Johnson, Hovey & Williams

[57] ABSTRACT

A generally rectangular, bottom-vented, mechanical draft combination wet-dry water cooling tower is provided which has excellent water conservation properties and resistance to recirculation of heated discharge air, and which is designed for minimizing undue low level deflection and spreading of hot moist discharge air with essentially complete elimination of visible fog plumes above the tower. In preferred forms, the tower includes a pair of elevated, two-pass, obliquely disposed heat exchange conduit banks, a plurality of spaced, underlying evaporative cooling sections located between the conduit banks for serially receiving partially cooled water therefrom, and separate induced draft fans and structure presenting individual air discharge paths for the dry and evaporative sections respectively, in order to pull air currents through each of the latter and separately discharge the resultant dry and moist airstreams upwardly into the atmosphere in a pattern such that the dry air at least partially surrounds the central moist air. Bottom-venting of the tower between the evaporative sections allows prevailing wind currents to flow under the dry section banks and transversely through the tower for venting wind-created negative pressure eddies or vortices on the lee side of the tower which in turn minimizes recirculation of hot discharge air back to the downwind tower air inlets. Moreover, the air discharge pattern of the tower lessens low level deflection and spreading of the central moist air so that unwanted deposition of moisture on adjacent equipment or structures is minimized.

19 Claims, 8 Drawing Figures

BOTTOM VENTED WET-DRY WATER COOLING TOWER

This invention relates to an improved, relatively low-cost combination wet-dry water cooling tower especially designed to minimize or overcome problems relating to recirculation of hot discharge air back to the air inlet faces of the tower and moisture deposition on adjacent structure and the like caused by low level deflection and spreading of hot moist discharge air. More particularly, it is concerned with a wet-dry tower which includes an elevated dry surface water cooling section and a plurality of spaced, centrally disposed evaporative water cooling sections below the dry section. The spacing between the underlying evaporative sections presents substantially unrestricted ventilation passages for allowing ambient wind currents to flow under the dry cooling section and through the tower for venting of wind-created negative pressure vortices and eddies on the downwind side of the tower, in order to minimize negative pressure induced recirculation of hot air back to the lee side cooling air inlets of the tower. In addition, separate fan assemblies for each of the dry and evaporative sections are provided, along with structure defining separate air discharge paths for each of the sections, so that mixing of the hot moist air from the evaporative section and hot dry air from the dry surface section is prevented prior to discharge of the air back to the atmosphere. The discharge pattern of the tower is such that the central hot moist air is at least partially surrounded by hot dry air so that moisture deposition on nearby equipment and the like is minimized.

Large water cooling towers of the type used in conjunction with power generating plants for cooling condenser water must meet a number of special criteria. First and foremost, such towers must be designed such that the plant water is maintained within a relatively narrow, preselected temperature range at all times. In this connection, efficient power plant operation is adversely affected if condenser water is insufficiently cooled by the tower, or on the other hand cooled to a temperature significantly below that called for. The inherent difficulty of maintaining design water temperatures is of course compounded by the fact that the water cooling facility must operate under all ambient weather conditions encountered in a given geographical area. For example, design of a cooling tower capable of successfully operating under widely varying conditions of temperature such as found in some desert and semi-arid regions can be extremely difficult.

In addition to the primary problem of design temperature maintenance, a number of other factors must be considered. For example, the well-known phenomenon of recirculation of hot discharge air from the tower outlet back to the cooling air inlets thereof must be minimized or avoided. As can be appreciated, significant recirculation of heated discharge air lowers the overall cooling capacity of the tower and may necessitate making the tower larger than would otherwise be necessary to meet a given heat load. Thus, from the standpoint of construction and operational costs of cooling towers, avoidance of substantial hot air recirculation is a prime factor.

One response to the recirculation problem has been to provide relatively tall discharge stacks at the tower outlets. Such stacks serve to return the hot discharge air to the atmosphere at a point remote from cooling air inlets of the tower, so that the probability of significant recirculation is lessened. However, such discharge stacks are extremely costly to construct and require extensive supports, and for there reasons the present-day trend is to avoid use of discharge stacks if at all possible. Accordingly, considerable research has been conducted in recent years in order to find ways of successfully overcoming the recirculation problem in stack-free towers. See, for example, U.S. Pat. No. 3,743,257.

It is known that recirculation most often occurs when ambient wind currents displace or deflect the hot air discharged from conventional towers such that the hot air is moved into proximity with the downwind tower air inlets. In addition, these prevailing wind currents simultaneously create negative pressure vortices or eddies on the lee side of the tower. Such vortices or eddies by virtue of the characteristic turbulence and reduced pressure developed at the centers thereof, tend to draw the hot discharge air downwardly to thereby increase the probability that such hot air will be recirculated back through the downwind inlets of the tower. One factor affecting the creation of downwind vortices or eddies is the overall configuration of the tower and the consequent aerodynamic downwind wake established when wind currents pass around and over the tower. For example, it is known that generally elongated or rectangular towers are more prone to have a problem with the formation of large vortices and the like as compared with annular or circular towers. Thus, strictly from a recirculation standpoint, round towers are preferred; however, the cost of these towers as compared with rectangular towers is substantial. Thus, the cooling tower designer has often heretofore been required to choose between constructing a rectangular tower which is usually sized larger than ideally necessary for handling the heat load imposed thereon because of recirculation problems, or a generally more expensive annular or circular tower.

Another problem inherent in many cooling tower designs which incorporate an evaporative or wet section stems from low level deflection and spreading of hot moist discharge air onto adjacent equipment or structures. This moisture laden air can envelop such adjacent equipment to an extent that the equipment becomes caked with mineral deposits, or even severely corroded. Thus, drift and deflection of hot moist discarge air can present serious problems, especially if the tower is located in densely populated areas or is a part of a large power plant or industrial complex.

Finally, in many specialized applications it is necessary to design and construct cooling towers which during certain times of the year require only a minimum of makeup water. For example, in desert areas or locations which experience periodic droughts, sufficient water may not be available at certain times to provide the necessary makeup for evaporative water cooling. The use of a completely indirect or so-called "dry" cooling tower is generally not the answer in such situations either, because the water cooling efficiency of such dry towers is considerably below that of evaporative units. Moreover, dry towers are significantly more expensive to construct and maintain, by virtue of the characteristic finned tube heat exchangers and the like conventionally provided with these units.

One relatively recent innovation in cooling tower design is the so-called wet-dry concept. Wet-dry towers include a separate dry surface water cooling section in conjunction with a conventional evaporative water cooling section. Hot water to be cooled is generally first passed through the dry section and then as necessary through the evaporative section. Cooling air currents are simultaneously drawn through the respective sections such that hot dry air emanates from the dry section and hot moist air passes from the evaporative section. The discharge air is then mixed in a common plenum chamber associated with the tower and discharged to the atmosphere. A prime advantage of wet-dry towers stems from the fact that the water cooling characteristics thereof can be varied over a wide range. In certain instances it may be advisable to run the initial hot water only through the dry section and completely bypass evaporative cooling; on the other hand during hot weather when a greater heat load is imposed upon the tower, straight evaporative cooling may be in order. Furthermore, the amount of dry and evaporative cooling can be readily monitored and altered as needed during moderate weather conditions. Finally, wet-dry towers are advantageous in that substantial savings in makeup water can be achieved through the use of the dry surface cooling sections thereof, and by virtue of the fact that these towers have a plume abatement capacity stemming from premixing of the hot moist air from the evaporative section with the dry air from the dry surface section prior to common discharge thereof to the atmosphere. Patents describing various types of wet-dry cooling towers include; U.S. Pat. Nos. 3,635,042, 3,846,519, 3,923,935, 3,925,523, and British Pat. No. 1,268,169.

Although wet-dry towers have achieved substantial commercial success in recent years, this concept in and of itself does little to alter the long standing problem of hot air recirculation discussed above. Thus, workers in the art have been searching for ways to improve the basic wet-dry idea by providing some means for minimizing or avoiding significant hot air recirculation. Furthermore, the problem of low level deflection and spreading of hot moist discharge air remains a problem with stack-free wet-dry towers, and especially those of the rectangular variety.

It is therefore the most important object of the present invention to provide a combination wet-dry water cooling tower which is especially designed for resistance to recirculation of heated discharge air into the downwind air inlet faces thereof, and which is constructed such that the air discharge pattern thereof serves to appreciably lessen undesirable low level deflection and spreading of the hot moist discharge air from the evaporative section of the tower, so that the latter is capable of efficiently cooling water during essentially all ambient conditions encountered in practice, with alleviation of the moist air drift problem characteristic of prior evaporative water cooling towers.

Another object of the invention is to provide a generally rectangular, stack-free bottom-vented mechanical draft combination wet-dry cooling tower which includes a plurality of central, spaced evaporative water cooling sections presenting substantially unrestricted ventilation passages between the sections for allowing prevailing wind currents to flow between the latter in order to vent wind-created negative pressure vortices or eddies on the downwind side of the tower, for minimizing negative pressure-induced recirculation characteristic of rectangular towers; in preferred forms, the dry section of the tower is in the form of a pair of elevated, obliquely oriented banks of water-conveying conduits disposed on opposite sides of the evaporative sections for serial flow of the hot water to be cooled through the dry and evaporative sections.

Another aim of the invention is to provide a wet-dry water cooling tower including an elevated dry surface water cooling section, an underlying evaporative water cooling section, and means for pulling respective ambient-derived cooling air currents through the dry and evaporative sections respectively, for discharge of the hot dry air from the dry surface section in a manner to at least partially surround the hot moist air emanating from the evaporative sections; this ensures that low level deflection and spreading of the central hot moist air is minimized to avoid problems of scaling and corrosion of adjacent equipment and structures, while moreover assuring that any of this hot moist air is adequately mixed with hot dry air prior to dispersal thereof so that any scaling and corrosion problems encountered are lessened. In addition, mixing of moist and dry air outside and above the tower inhibits the formation of visible fog plumes above the tower.

As a corollary to the foregoing, another object of the invention is to provide a wet-dry tower of the type described which includes separate induced draft fan assemblies for the dry and evaporative sections of the tower, so that the airstreams emanating from each of the sections can be separately discharged to the atmosphere; structure is also provided for defining respective air discharge paths in the tower for preventing mixing of the hot moist air from the evaporative sections and the hot dry air from the dry sections prior to discharge of the airstreams to the atmosphere so that the hot moist air can be concentrated in a central, relatively high kinetic energy column which can achieve maximum height before significant dispersal thereof.

A still further object of the invention is to provide a series water path, parallel air path combination wet-dry cooling tower wherein the series water path is arranged such that the siphon loop hydraulic design dry surface heat exchanger section is upstream and physically above the evaporative heat exchanger section for gravity-induced serial flow of the hot water to be cooled; the dry surface cooling section preferably includes a pair of spaced, opposed banks of fluid-conveying conduits which are obliquely oriented in a manner to give a dry section of adequate cooling length while at the same time minimizing the overall height of the tower structure to thereby lessen the start up pumping heat requirement.

Another aim of the invention is to provide a wet-dry tower of the type described wherein the cooling performance of the overall tower can be precisely controlled by means of fan modulation, dampering of the dry and/or evaporative sections, and bypassing of the evaporative section to achieve thermal or water conservation goals or both; moreover, the functional arrangement of the tower provides protection against tower freeze up, and the gravity feeding arrangement from the dry to wet sections allows a free draining atmospheric discharge, siphon loop dry section hydraulic design to protect the tower from freezing in case of complete shutdown.

In the drawings:

FIG. 4 is a vertical sectional view taken along line 4—4 of FIG. 3 and illustrating certain of the internal details of the tower;

Figure 2:
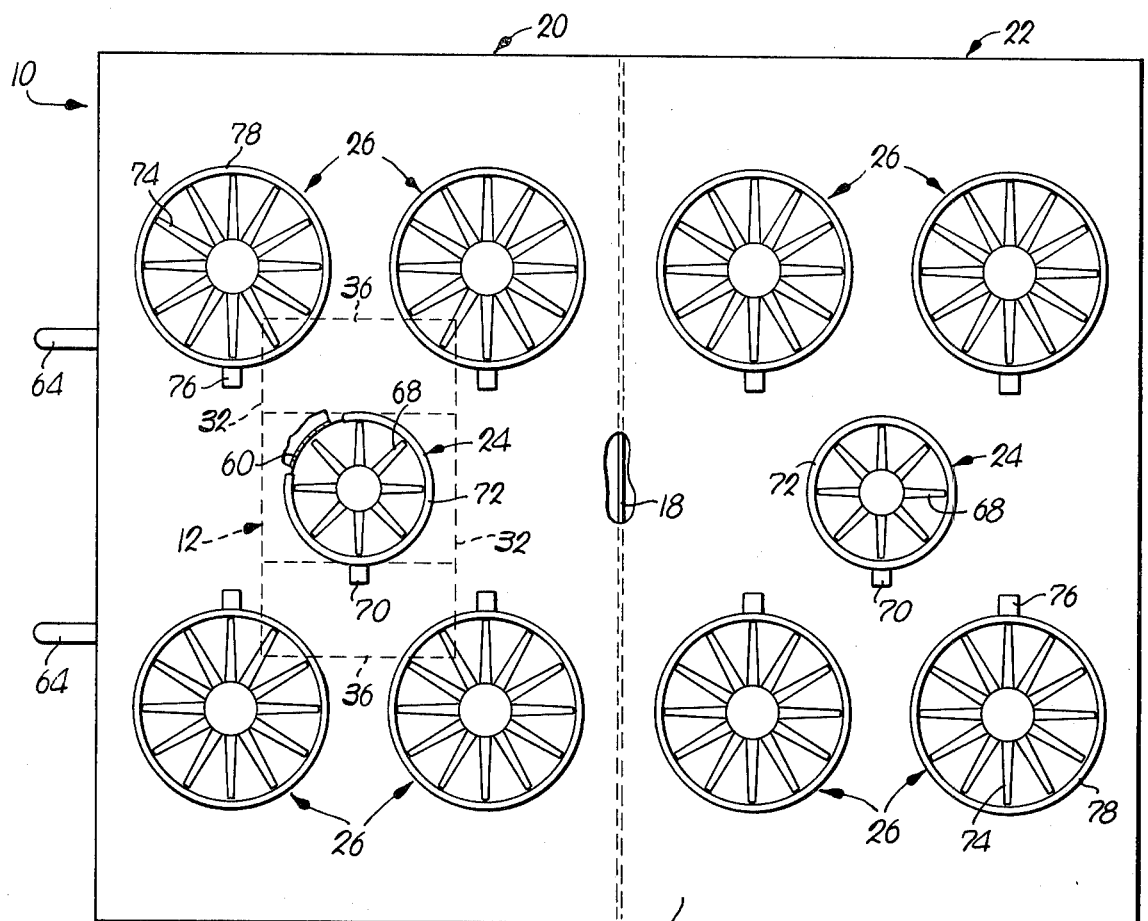
FIG. 2 is a top plan view of the tower illustrated in FIG. 1 with parts broken away for clarity.
Figure 3:
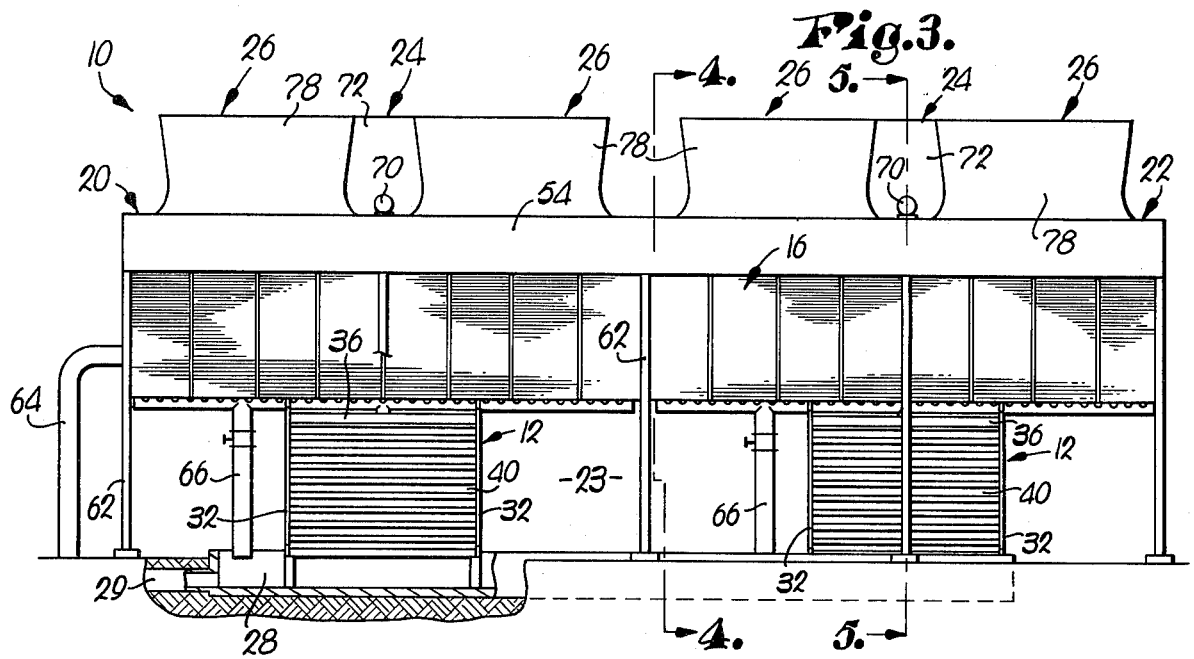
FIG. 3 is a side elevational view with parts broken away for clarity of the tower illustrated in FIGS. 1 and 2.

Cooling tower 10 in accordance with the invention is of the mechanical induced draft, series water path parallel air path wet-dry variety and is generally rectangular in plan configuration (FIG. 2). Tower 10 broadly includes a plurality of central, spaced wet or evaporative water cooling trimmer sections 12, along with an elevated dry surface water cooling section 14 which preferably includes a pair of laterally spaced banks 16 of two-pass hot water-conveying indirect heat exchange conduits. The latter are obliquely oriented in an elevated position and disposed for gravity flow of water into the evaporative sections 12. In the depicted tower 10, the elongated banks 16 are divided by an upright, transversely extending partition wall 18, so that the tower in effect includes separate adjacent cells 20 and 22. Each of these cells include one of the evaporative sections 12 and a corresponding portion of the dual-bank dry section 14 thereabove. The unrestricted space between the evaporative sections 12 serves as a ventilation passage 23 which is important for reasons to be made clear hereinafter. Finally, tower 10 also includes separate fan means broadly designated 24 and 26 for the evaporative sections 12 and dry section 14 respectively, along with a common underlying cold water collection basin 28 and a cool water return conduit 29.

Figure 5:
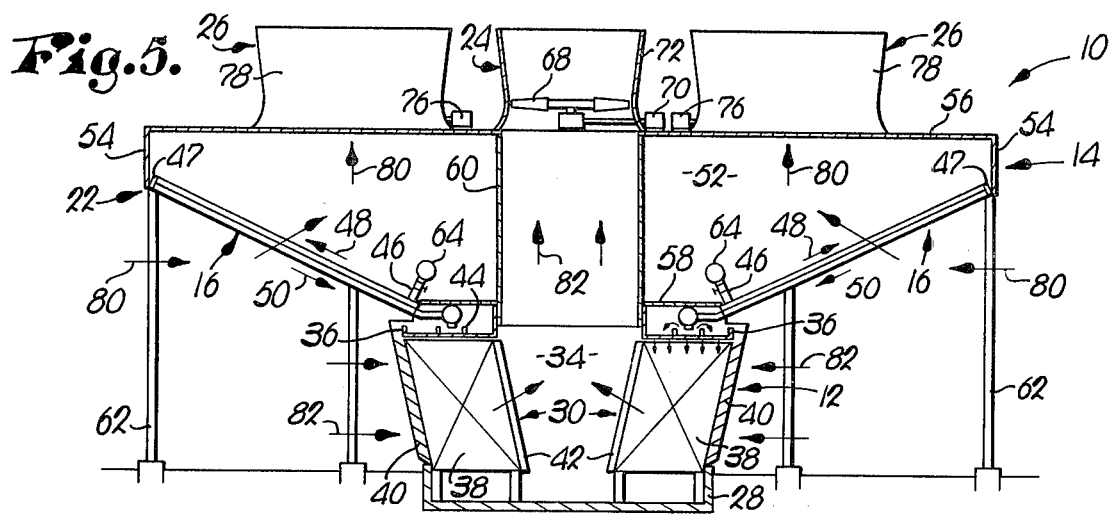
FIG. 5 is a vertical sectional view taken along line 5—5 of FIG. 3 and depicting further details of the internal construction of the tower.

In more detail, each evaporative trimmer section 12 is of generally rectangular box-like configuration and includes a pair of identical, spaced, opposed evaporative units 30 which, in cooperation with imperforate sidewalls 32, define a common central plenum chamber 34 therebetween. Each evaporative unit 30 is of conventional construction and includes an uppermost, generally horizontally extending, apertured hot water distribution basin 36, and underlying evaporative fill structure 38 which serves to disperse hot water gravitating from the latter. Fill structure 38 can be of the horizontally extending splash bar type, or of the vertically extending sheet or film type, as those skilled in the art will readily appreciate. Each evaporative unit 30 also includes the usual obliquely oriented inlet louvers 40 adjacent the inclined air inlet face thereof, along with schematically depicted drift elimination structure 42 adjacent the air outlet face thereof for removing entrained water droplets from the moist air emanating from the fill structure. In practice, each of the distribution basins 36 may be equipped with conventional box-type structure 44 for ensuring even flow of water throughout the basin and the underlying fill structure 38. As best seen in FIG. 5, both of the evaporative units 30 are supported above common basin 28 so that water gravitating through the units 30 is collected within the basin in the usual fashion.

As explained, dry section 14 preferably includes a pair of spaced, identical banks 16 of hot water-conveying indirect heat exchange conduits which may be of the usual finned tube variety. Referring to FIGS. 4 and 5, it will be seen that the respective banks 16 are disposed in an elevated position above the central underlying evaporative sections 12 and on opposite sides of the latter. The banks 16 are preferably of the two-pass variety and oriented in an oblique manner as shown, in order to facilitate gravitational flow of water to the underlying evaporative sections. This is advantageous in that the maximum effective cooling length of the conduit banks can be obtained while minimizing the pumping head requirement to the tower. In the most preferred form, each bank 16 is configured and arranged for two-pass, siphon loop, atmospheric discharge flow of hot water therethrough, in order to further lessen pumping head requirements and ensure complete draining of the conduits as a freeze protection in the case of cold weather tower shutdown when delivery of water to the banks 16 is discontinued; the residual water within the banks 16 is allowed to gravitate either through the evaporative units or in bypassing relationship thereto so that this water does not freeze in the banks 16. In this connection, the respective portions of the two-pass conduits are preferably arranged in a vertically stacked manner. Conventional, valved hot water inlet structure 46 is provided adjacent the lower end of the uppermost two-pass conduit portions, along with uppermost headers 47, for ensuring substantially even water flow throughout the lengths of banks 16. Hot water supply conduit 64 serves to deliver water to the inlet pipes 46 joined to respective air cooled banks 16. This water feeding arrangement also ensures that the first pass of water through the two-pass arrangement occurs through the upper conduit section, while the second pass travels through the lowermost section thereof. This two-pass flow arrangement is illustrated by the arrows 48 and 50 in FIGS. 4 and 5. The effect of this type of two-pass water flow through the respective banks 16 is to maximize indirect cooling by allowing the temperature of the water within the lowermost conduit sections to approach that of the coldest ambient air entering dry section 14 and passing through and around the conduit sections.

Dry section 14 also includes a pair of somewhat trapezoidally shaped end walls 52, a pair of spaced, elongated relatively narrow sidewalls 54, an apertured, generally horizontally extending fan deck or top wall 56, and an apertured, generally horizontally spaced bottom wall 58 which directly overlies and bridges the respective evaporative sections 12 (see FIG. 4). End walls 52 and sidewalls 54 extend upwardly from the respective banks 16, and, in cooperation with fan deck 56, bottom wall 58 and intermediate upstanding partition wall 18, define respective air discharge paths for the dry section cells 20 and 22. In addition, a pair of spaced, upstanding tubular cylinders 60 extend through bottom wall 58 and respectively communicate with the plenum chambers 34 of the evaporative sections 12 (see FIG. 5). The cylinders 60 extend upwardly through fan deck 56 in order to define separate air discharge paths for the hot moist discharge air from the individual evaporative sections 12, which is important for reasons to be discussed hereinafter.

Each bank 16 and the associated inlet and header structure 46 and 47 is supported in an inclined orientation by means of a series of spaced upright struts 62. The elongated, generally horizontally extending hot water supply conduit 64 provided for each bank 16 supplies hot water as needed along the entire length of the banks. The conduits 64 are connected to valved inlets 46 for this purpose. Separate, depending, valved bypass conduits 66 are connected to the two-pass heat exchange conduit banks adjacent each evaporative section 12 for allowing selective bypass of the evaporative sections as needed. This permits selective use of tower 10 only as a completely indirect or dry heat exchanger, or alternately use of only one of the evaporative sections. This operational flexibility is important for maintaining the narrow design temperature range under widely varying ambient conditions.

A single induced draft fan assembly 24 is provided for each evaporative section 12 and is located in communication with the corresponding discharge cylinder 60. Each assembly 24 is mounted on deck 56 and includes a fan blade 68 rotatable about an upright axis, an electric drive motor 70, and a venturi-shaped velocity recovery stack 72 positioned in circumscribing relationship to blade 68 and in substantial registry with cylinder 60.

Each dry section cell 20 and 22 includes four induced draft fan assemblies 26 which are each somewhat larger than the central evaporative section fan assembly 68 (see FIG. 2.). The assemblies 26 for each cell are arranged about the central fan assembly 24 in substantially surrounding relationship to the latter. Each fan assembly 26 is of conventional construction and includes a rotatable fan blade 74, drive motor 76, and velocity recovery stack 78. As will be readily understood, the fan assemblies 24 and 26 are respectively operable for pulling air currents through the dry and evaporative sections and discharging such air back to the atmosphere. In order to increase operational control of the tower, the fans are preferably of the two-speed (or even variable speed) variety, and are individually controllable.

In the operation of tower 10, hot water to be cooled is first passed through the supply conduits 64 and inlets 46 and ultimately to the separate banks 16 of dry section 14. As explained, the hot water initially passes upwardly through the uppermost conduit portions and thereafter passes through the lowermost portions for ensuring the closest possible approach between the water within the dry section 14 and the ambient cooling air. In any event, during this passage of hot water through the banks 16, cooling air currents are pulled through section 14 by means of the clustered fan assemblies 26. This causes indirect sensible heat exchange between the water within the conduit banks 16 and the ambient air currents, in order to partially cool the water and give hot dry discharge air. The latter is discharged in a generally upright direction out the respective velocity recovery stacks 78 in the usual fashion. The flow of air currents through each cell of the dry section 14 is illustrated by the arrows 80.

Partially cooled water from the banks 16 is then fed by way of atmospheric discharge to the respective distributions basins 36 forming a part of the underlying evaporative units 30. The partially cooled water is allowed to gravitate through the fill structure 38 of each unit 30 in the normal manner. During this gravitational flow, additional cooling air currents represented by the arrow 82 are pulled through the evaporative units 30 by means of the fan assemblies 24, for direct, crossflowing, intersecting thermal interchange with the partially cooled water gravitating through the fill structures 38. This heat exchange creates hot, moist discharge air which passes through the respective plenum chambers 34 and upwardly through the discharge cylinders 60 for upright discharge of the hot moist air in general parallelism to the discharge paths of the hot dry air.

It is important in this connection to note that the air discharge paths for the hot dry air and the hot moist air are separate through tower 10 in order to prevent mixing of the moist and dry air prior to discharge thereof. Moreover, the discharge pattern is such that the hot moist air is at least partially surrounded by hot dry air, and this factor is important for reasons to be explained.

While the serial water path, parallel air path water cooling scheme described above is in general well understood, a number of highly unexpected and advantageous operational features have been discovered in connection with the presently disclosed tower design. One of the most important features stems from the fact that prevailing wind currents passing through ventilation passage 23 between the evaporative sections 12 serves to vent and effectively disrupt wind-created negative pressure vortices and eddies normally created in the aerodynamic wake of rectangular towers. Such venting is extremely important for minimizing recirculation of hot discharge air back to the lee side air inlets of the dry and evaporative cooling sections. That is, bottom-venting of the tower 10 by virtue of ambient wind currents passing under the dry section 14 and between the evaporative sections 12 is unexpectedly effective in venting and disrupting the formation of such large vortices and eddies, with the effect that hot air recirculation normally induced by such vortices and eddies is significantly lowered. Thus, the recirculation problem heretofore encountered with stack-free mechanical draft towers of rectangular configuration is in large measure alleviated.

Tower 10 is also advantageous in that the air discharge pattern thereof serves to lessen undesirable low level deflection and spreading of the hot moist discharge air from the evaporative sections 12. Specifically, generally vertical discharge of the hot dry air from the tower in partial surrounding relationship to the central discharge of hot moist air prevents the latter from excessive deflection and spreading at low heights which can cause scaling and/or corrosion of adjacent equipment and structures. Although this phenomenon is not completely understood, it is believed that the surrounding hot dry air forms a barrier of sorts around the moist air serving to canalize the latter upwardly where is can be spread and dispersed without fear of untoward effects. Moreover, even during high wind conditions which would normally be expected to create severe deflection and spreading problems, the moist air is effectively admixed with the surrounding hot dry air so that the resultant air is less moisture-laden. Finally, by virtue of the fact that the hot moist air and hot dry air remain unmixed prior to discharge thereof, it is believed that the relatively high kinetic energy of the unmixed moist air allows the latter to rise to a relatively high altitude before significant dispersal begins.

The air discharge pattern of tower 10 also effectively serves to substantially overcome the problem of fog or plume formation above the tower. It has been discovered that the separate dry and moist airstreams, even without premixing in tower 10, adequately commingle to prevent visible plume formation. Thus a prime advantage of conventional wet-dry towers is retained in the present invention.

Figure 6:
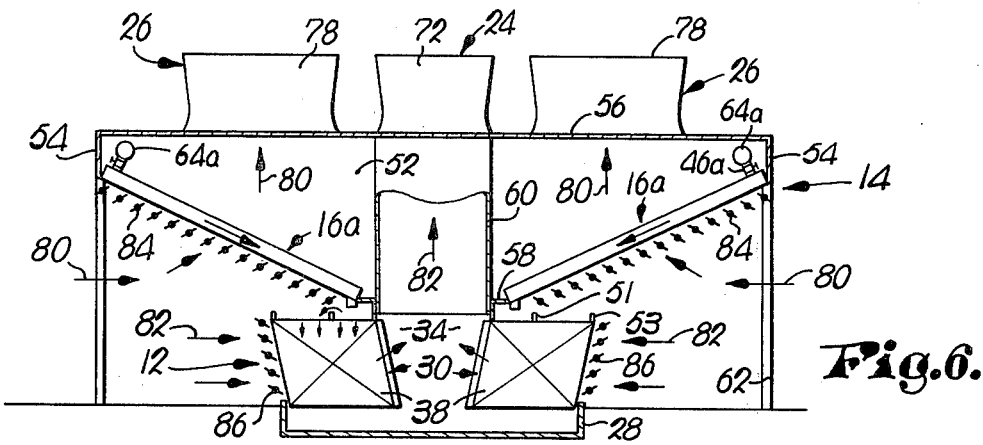
FIG. 6 is a vertical sectional view similar to that of FIG. 5 of another embodiment of the invention wherein one-pass dry surface heat exchange conduit banks are employed, along with selectively shiftable damper structure adjacent the air inlet faces of the dry and evaporative sections.
Figure 7:
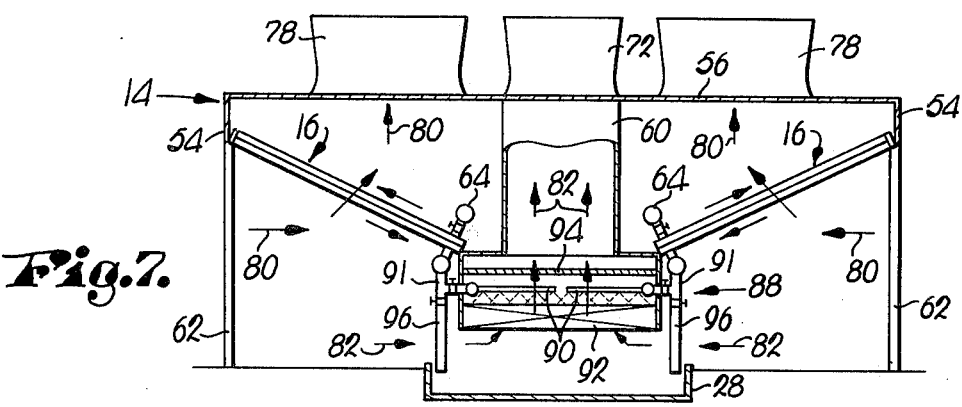
FIG. 7 is a vertical sectional view of another embodiment of the invention employing two-pass dry section fluid-conveying conduits feeding into central, counterflow-type evaporative cooling sections therebelow.
Figure 8:
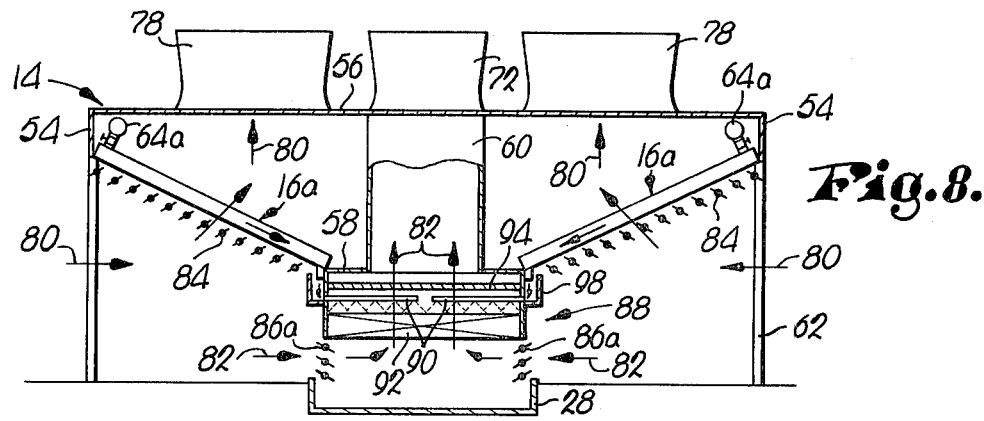
FIG. 8 is a vertical sectional view of yet another embodiment of the invention employing single pass dry heat exchange conduits, central counterflow evaporative sections, and shiftable damper structure adjacent the air inlet faces of the dry and evaporative sections.

Various alterations and modifications can be made in the preferred tower construction illustrated in FIGS. 1-5 without departing from the spirit of the present invention. For example, the overall tower can be constructed of essentially any desired length simply by adding additional evaporative sections and corresponding dry cells. Also, the arrangement of the hot dry air discharge fans can be altered to give a more clustered orientation. A number of other alterations can also be made in tower 10 to enhance the operational flexibility thereof. FIGS. 6-8 depict certain of these modifications by way of illustration only. (In the ensuing discussion of FIGS. 6-8, previously described components have been given their identical reference numerals.)

FIG. 6 illustrates the use of one-pass, atmospheric discharge heat exchange conduit banks 16a, wherein the horizontally extending supply conduits 64a and inlets 46a are located adjacent the upper ends of the banks. This assures the desired gravitational flow of the hot water through the one-pass banks and thereafter into the evaporative trimmer sections therebelow. Partially cooled water leaving banks 16a is discharged into open distribution flume structure 51. Openings in the bottom wall of flume 51, as well as in the bottom of adjacent distribution basin 53 equalize water flow out the underlying fill structure 38 of respective evaporative units 30. In addition, selectively actuatable variable damper structures 84 and 86 are located respectively adjacent the air inlet faces of the dry and evaporative sections. In the known manner, the damper structures 84 and 86 can be used to control airflow, and thus cooling, within the dry and evaporative sections. This increased operational control may be useful during certain ambient weather conditions for maintaining design water temperatures as explained.

FIG. 7 depicts the use of a counterflow evaporative cooling section 88. Section 88 includes horizontally extending hot water spray system 90 which is fed from overlying two-pass dry section conduit banks 16 through the valved delivery pipe structures 91 connected to each of the latter. Counterflow fill structure 92 is situated below the distribution pipes for dispersing the hot water from the spray system 90. Conventional counterflow drift elimination structure 94 is located above the spray system 90 for removing a large proportion of entrained water droplets from the moist air leaving evaporative section 88. In this case two-pass indirect water cooling in dry section 14 is identical with that described in connection with the FIG. 1 embodiment, while vertically intersecting counterflow evaporative cooling occurs in section 88. However, the advantages described above with respect to bottom venting and separate, unmixed discharge of the hot moist and hot dry discharge airstreams obtain in like manner in the FIG. 7 embodiment. Finally, it will be noted that a pair of depending, valved bypass pipes 96 are provided for allowing selective bypass of the counterflow evaporative section 88.

FIG. 8 is similar to FIG. 7 but illustrates the use of one-pass indirect heat exchange conduit banks 16a with counterflow evaporative section 88. Also, in the FIG. 8 embodiment the partially cooled water from the banks 16a is allowed to gravitate through the atmosphere for collection in peripheral basin 98 prior to passage through the spray system 90; this is contrasted with the FIG. 7 showing wherein serial flow from the conduit banks is controlled and directed through the illustrated pipe structures 91. Finally, FIG. 8 illustrates the use of selectively operable damper structures 84 adjacent the air inlet faces of the conduit banks, along with damper structure 86a adjacent the opposed air inlet faces of the counterflow section 88.

Figure 1:
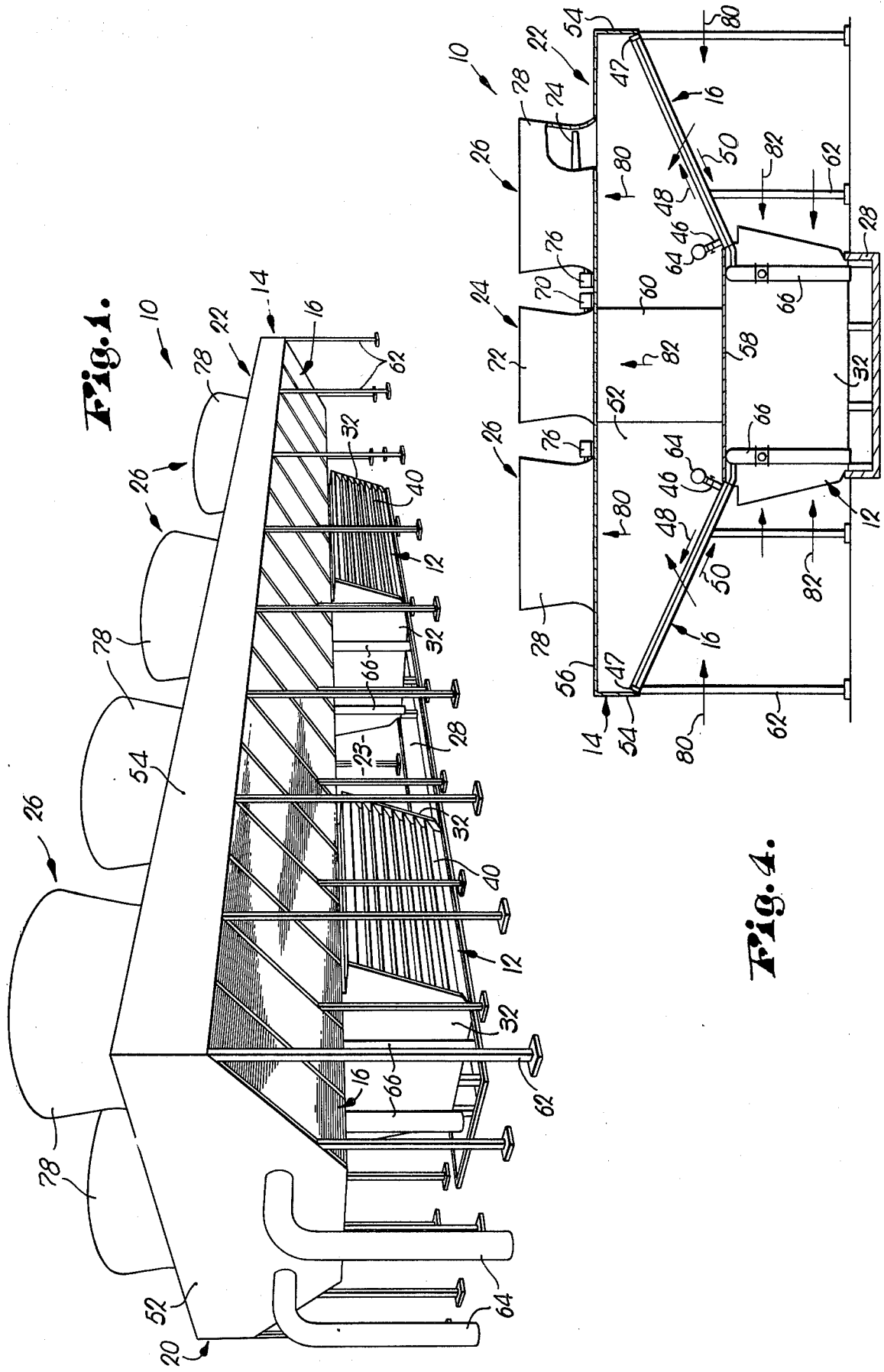
FIG. 1 is a perspective view of a mechanical draft wet-dry cooling tower in accordance with the invention.

The operation of the FIG. 6-8 embodiments is essentially identical with that described in connection with FIG. 1, and all important advantages of the latter embodiment are retained. However, the FIG. 6-8 modifications illustrate the many alternatives possible which can enhance operational control. For example, tower performance may be controlled by fan modulation or by combinations of fan modulation, evaporative and/or dry section dampering or by partially or completely bypassing one or more of the evaporative sections. All of these possible options make it easier to achieve design water temperature maintenance under the widely varying weather conditions often experienced in practice.

Having thus described the invention, what is claimed as new and desired to be secured by Letters Patent is:

1. A wet-dry water cooling tower, comprising: a central evaporative water cooling section;
   a dry surface water cooling section;
   means for supplying hot water to be cooled to said dry section for flow therethrough;
   means supporting said dry section above said evaporative section and in at least partial surrounding relationship to said central evaporative section for serial flow of said hot water through said dry and evaporative sections;
   structure defining separate air discharge paths for air currents passing from said dry and evaporative sections for preventing mixing of the air from each section prior to discharge thereof from the tower; and
   first and second fan means respectively for pulling corresponding ambient-derived cooling air currents through said dry section and said evaporative section and along respective air discharge paths provided for each of the same for thermal interchange with the hot water passing through each of the sections to thereby produce hot moist discharge air to the atmosphere from the evaporative section and hot dry discharge air to the atmosphere from the dry section,
   said path-defining structure and air-pulling means being cooperatively constructed and arranged for independent generally upright discharge of said hot moist air at the central region of said tower, and for independent generally upright discharge of said hot dry air separately from the hot moist air and in spaced, substantial surrounding relationship to the latter for lessening characteristic low level deflection and spreading of the hot moist air caused by ambient wind currents.

2. The tower as set forth in claim 1 wherein said dry section comprises separate, laterally spaced banks of fluid-conveying indirect heat exchange conduits respectively disposed in an oblique orientation and on opposite sides of said evaporative section.

3. The tower as set forth in claim 1 wherein said tower is of elongated, generally rectangular configuration and includes a plurality of spaced, centrally disposed evaporative sections along the length thereof, and a pair of separate, elongated, two-pass indirect heat exchange fluid conduit banks, the latter being respectively disposed on opposite sides of said plurality of central evaporative sections.

4. A water cooling tower as set forth in claim 1 wherein is provided:
- a plurality of spaced, aligned, generally rectangular evaporative water cooling sections having dry sections adjacent thereto and provided with a pair of air inlet faces on opposite sides thereof and plenum-defining walls on the remaining sides thereof, there being
- elongated, elevated structure supporting said dry surface water cooling sections disposed atop said evaporative sections and in bridging relationship to the latter to present an elongated, generally rectangular configuraion for said tower,
- the spacing between adjacent pairs of evaporative sections presenting a substantially unrestricted ventilation passage for allowing ambient wind currents to flow under said structure and transversely through said tower for venting wind-created negative pressure vortices or eddies on the downwind side of the tower, in order to minimize negative pressure-induced recirculation of hot air discharged from the tower back to the downwind inlet faces of said evaporative sections.

5. The tower as set forth in claim 4 wherein said elongated structure includes at least one bank of hot water-conveying indirect heat exchange conduits, and said hot water supply means includes means for directing said hot water to said conduits for serial passage through the conduits and thereafter through said evaporative sections.

6. A mechanical draft wet-dry cooling tower, comprising:
- a generally rectangular dry surface water cooling section having a plurality of hot water-conveying indirect heat exchange conduits;
- means supporting said dry surface cooling section in an elevated position above the ground;
- means for supplying hot water to be cooled to said conduits for flow therethrough;
- first fan means associated with said dry surface cooling section or drawing ambient-derived cooling air thereinto for flow past said conduits in sensible heat exchange relationship with said hot water flowing through the latter, and for discharge of heated, dry air back to the atmosphere in a generally upright direction;
- a series of horizontally spaced, individual evaporative water cooling sections located in the space between the ground and said dry cooling section,
- the spacing between adjacent pairs of said evaporative sections presenting a substantially unrestricted ventilation passage therebetween for allowing ambient wind currents to flow under said dry surface cooling section and through said tower for venting of wind-created negative pressure vortices or eddies on the downwind side of the tower, in order to minimize negative pressure-induced recirculation of hot air discharged from the tower back to the cooling air inlets thereof;
- means for directing at least a portion of the partially cooled water from said dry surface cooling section to at least one of the evaporative sections for gravitational flow through the same;
- structure defining an upwardly extending, moist air discharge cylinder for each of said evaporative sections for discharge of moist air from the evaporative sections separately from said heated, dry air; and
- second fan means associated with each of said evaporative cooling means and the corresponding discharge cylinders for drawing ambient-derived cooling air through the evaporative sections in evaporative heat exchange relationship with the partially cooled water flowing therethrough, and for discharge of said moist air in general upright parallelism with the discharge flow of said heated, dry air in order to allow mixing of the dry and moist discharge air only above and exteriorily of the tower for control of visible plume.

7. The tower as set forth in claim 6 wherein said dry water cooling section includes a pair of laterally spaced banks of hot water-conveying indirect heat exchange conduits and a plurality of spaced, separate fan means for each bank, with said discharge cylinders extending upwardly between said banks for discharge of said moist air along the central area of said tower, and discharge of said heated dry air along both sides of the discharged moist air in spaced, generally surrounding relationship to the latter.

8. The tower as set forth in claim 7 including a number of spaced, upright wall means extending upwardly from each bank of said conduits, adjacent pairs of said wall means presenting separate dry surface cooling cells and in part serving to define a hot dry air discharge path for the cells, each cell including at least one of said fan means and being associated with one of said evaporative sections.

9. The tower as set forth in claim 6 wherein said water-conveying conduits are obliquely disposed for gravitational flow of said hot water therethrough.

10. The tower as set forth in claim 6 wherein said conduits are configured and arranged for two-pass flow of said hot water therethrough with the first pass conduit section being disposed above the second pass conduit section.

11. The tower as set forth in claim 6 wherein said conduits are configured and arranged for single pass flow of hot water therethrough.

12. The tower as set forth in claim 6 wherein said evaporative water cooling sections each include separate, horizontally spaced, opposed, crossflow evaporative cooling units which in part cooperatively define an enclosed plenum chamber therebetween, with the discharge cylinder for each section being in communication with the corresponding underlying plenum chamber.

13. The tower as set forth in claim 6 including selectively shiftable damper structure disposed in covering relationship to the air inlet face of said dry surface cooling section.

14. The tower as set forth in claim 6 including selectively shiftable damper structure disposed in covering relationship to the air inlet face of said evaporative cooling section.

15. The tower as set forth in claim 6 wherein said evaporative water cooling sections each comprise a single counterflow evaporative section having the air outlet thereof in communication with the corresponding discharge cylinder.

16. The tower as set forth in claim 6 including means for selectively bypassing the flow of said partially cooled water for collection thereof without passage through said evaporative section.

17. The tower as set forth in claim 6 including a common elevated fan deck overlying said evaporative water cooling section and said dry surface cooling section and supported by the latter, said fan deck being apertured for and supporting said first and second fan means.

18. The tower as set forth in claim 6 including a common underlying cold water collection basin beneath said evaporative sections for collecting cold water gravitating from each of the latter.

19. The tower as set forth in claim 6 including respective venturi-shaped velocity recovery stacks positioned in circumscribing relationship to each of said first and second fan means.

* * * * *